United States Patent

[11] 3,528,351

[72] Inventors Karl-Heinz König,
Stuttgart;
Heinz Thiele, Leinfelden, near Stuttgart,
Germany
[21] Appl. No. 739,339
[22] Filed June 24, 1968
[45] Patented Sept. 15, 1970
[73] Assignee Zeiss Ikon Aktiengesellschaft
Stuttgart, Germany
a corporation of Germany
[32] Priority June 29, 1967
[33] Germany
[31] Z 12,923

[54] PHOTOGRAPHIC CAMERA WITH AUTOMATIC
EXPOSURE ADJUSTMENT
4 Claims, 5 Drawing Figs.
[52] U.S. Cl............................................. 95/10,
95/64
[51] Int. Cl............................................. G03b 7/08,
G03b 9/58

[50] Field of Search.................................... 95/10C,
53, 64B

[56] References Cited
UNITED STATES PATENTS
3,416,421 12/1968 Biedermann et al.......... 95/10(C)UX
3,442,190 5/1969 Erickson .................... 95/10(C)UX Primary Examiner—Norton Ansher
Assistant Examiner—Joseph F. Peters, Jr.
Attorney—Singer, Stern and Carlberg ABSTRACT: A photographic camera equipped with a photoelectric exposure meter employing a photo-resistance cell illuminated by light passing through the camera objective. A group of resistors stores all of the exposure factors, such as shutter speed, film speed necessary for making a correct exposure with one exception, for instance the diaphragm aperture, in an automatic exposure-determining mechanism or circuit, and the remaining exposure factor, for instance the diaphragm aperture, which is represented by a variable resistor which during its adjustment produces a balance between a constant resistance value ratio and the photo-resistance cell.

Patented Sept. 15, 1970
3,528,351
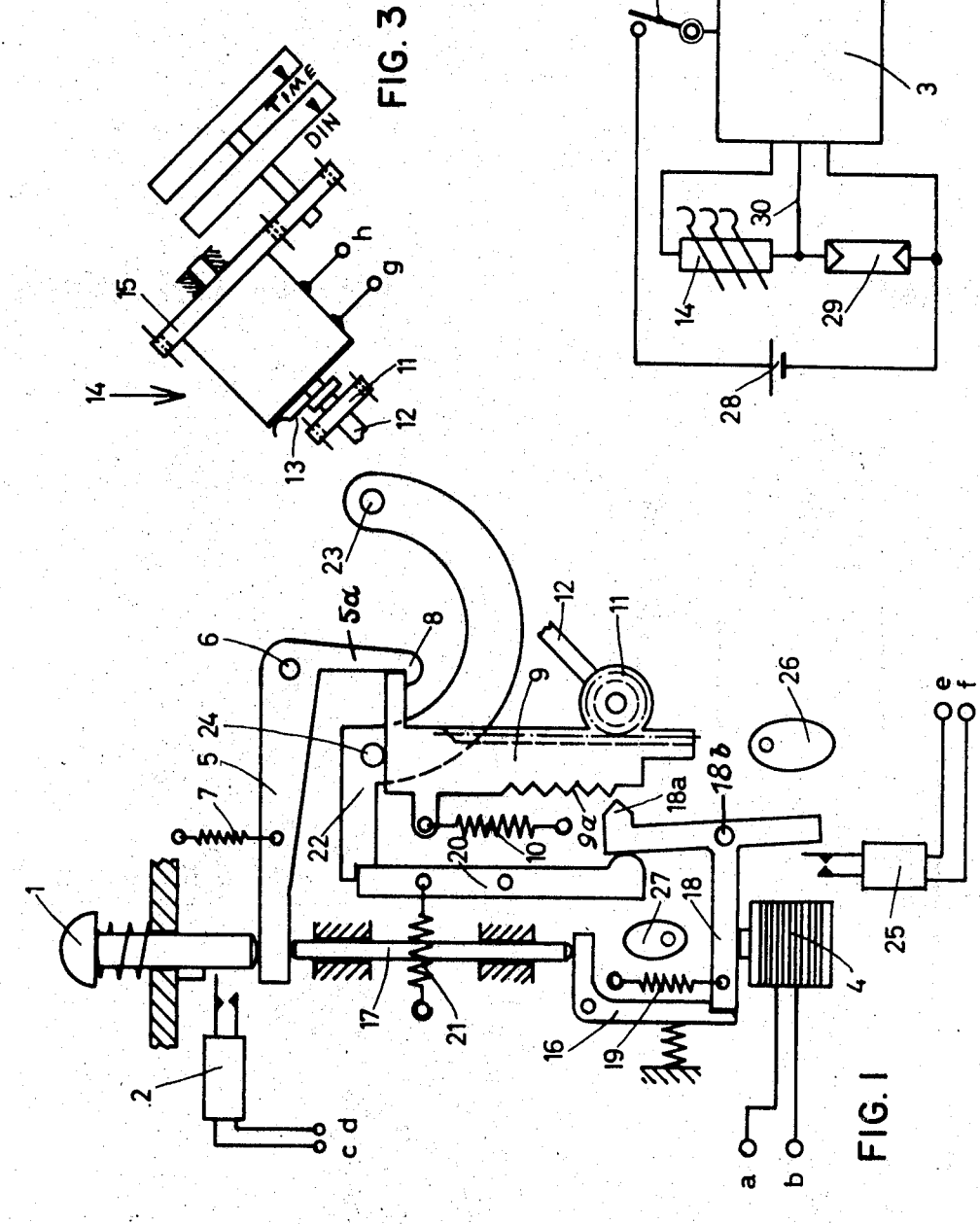
INVENTOR
Karl-Heinz König
Heinz Thiele
BY Singer, Stern & Carlberg
Attorneys

PHOTOGRAPHIC CAMERA WITH AUTOMATIC EXPOSURE ADJUSTMENT

The invention relates to a photographic camera, preferably a single-lens mirror reflex camera equipped with a photo-resistance cell which is illuminated by light passing through the camera objective.

In known cameras of this kind, the photo-resistance cell is disposed in the rear of the camera diaphragm in the direction of incidence of the light. Due to a certain inertia inherent in photo-resistance cells, the result of the measurement will be indicated only with some delay or, if the camera is automatic, and therefore the automatic setting also somewhat delayed. Since during this period of delay, the diaphragm adjustment continues, it is obvious that either too large or too small a diaphragm aperture is determined, depending on whether the diaphragm adjustment was started with the smallest or with the largest aperture. This disadvantage can be avoided when the photo-resistance cell is always subjected to the illumination of the object to be photographed without arranging light-weakening means in front of it. This may be accomplished in known manner in that the photo-resistance cell is arranged at the exterior wall of the camera, preferably on the objective mount. If the photo-resistance cell is disposed inside the camera and is illuminated by the camera objective, then the light measurements always have to be taken with a fully opened diaphragm aperture or with a predetermined constant diaphragm value, i.e. the initial value.

In single-lens mirror reflex cameras, it is customary to reflect the light passing through the camera objective over a tiltable mirror onto the photo-resistance cell. When the shutter is operated, the tiltable mirror causes the exposure of the film and thereby interrupts the illumination of the photo-resistance cell. The measuring value of the photo-resistance cell which is to be used for control purposes, such as for example the shutter speed, is thereby lost. Consequently, measures have to be taken to preserve and store the measured value. This may be accomplished, for instance, in that prior to operating the shutter, the measured value is made available by a scanning of the pointer of an exposure meter. This requires the use of a measuring instrument whose presence, however, is no longer necessary in many of the modern cameras, as for instance in fully automatic cameras in which the adjustment values computed by the automatic mechanism may be checked by lamp indication means.

The object of the invention is to dispense with an exposure meter in cameras of the aforementioned type, whereby the heretofore customary methods for storing the exposure factors are eliminated.

This is accomplished according to the invention in that the storing of all of the exposure factors necessary for an exposure in agreement with the prevailing light conditions —which storing is to be effected prior to the shutter release— is concentrated in a group of resistors embodying these exposure factors or in a function potentiometer, respectively, whereby these factors with the exception of one, are pre-adjustable. The one remaining exposure factor which is also represented by a resistor, establishes in its variation until balance is reached, a constant resistance ratio between the photo-resistance cell and the resistor group. The resulting partial potential conducted by electronic gate or amplifier circuits serves to limit directly or indirectly and preferably electromagnetically the balance value of the factor still to be adjusted, for example by means of a mechanical adjustment member of this factor.

These and other objects of the invention will be further described with reference to the accompanying drawings in which:

FIG. 1 illustrates diagrammatically a mechanism for automatically adjusting in a camera the diaphragm aperture required for a correct exposure;

FIG. 2 illustrates diagrammatically the electric wiring diagram employed in the present invention;

FIG. 3 illustrates diagrammatically a resistor group and the means for adjusting the same in accordance with pre-selected film speed and shutter speed values;

Figure 4:
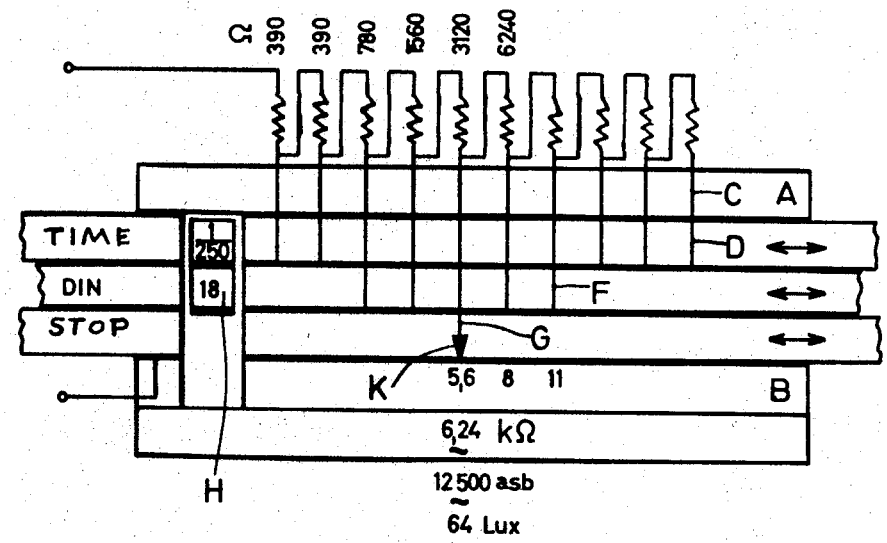
FIG. 4 illustrates another diagrammatic view of the parts shown in FIG. 3.

When according to FIG. 1, a camera release button 1 is operated, this has the result that first a switch 2 is closed which according to FIG. 2 energizes a magnet 4 and an electronic amplifier 3. The contacts a, b, and c, d establish the connections according to FIG. 2. Secondly, by actuating the camera release button 1, a right-angled locking lever 5 engaged by the button 1 and rotatably mounted on an axis 6 with its apex and biased by a spring 7, is rotated counterclockwise. This causes a nose 8 on a downwardly extending arm 5a of the lever 5 to release a vertically disposed rack bar 9, which moves downwardly under the action of a spring 10, to rotate a gear wheel 11 which is disposed on a shaft 12 which moves the slide contact 13 of the resistor group 14 (FIG. 3). The housing plate 15 of the resistor group 14 introduces the film speed (DIN) and the shutter speed into the exposure mechanism when the rack bar 9 acts upon the diaphragm adjusting ring or the diaphragm stop means, respectively.

Figure 5:
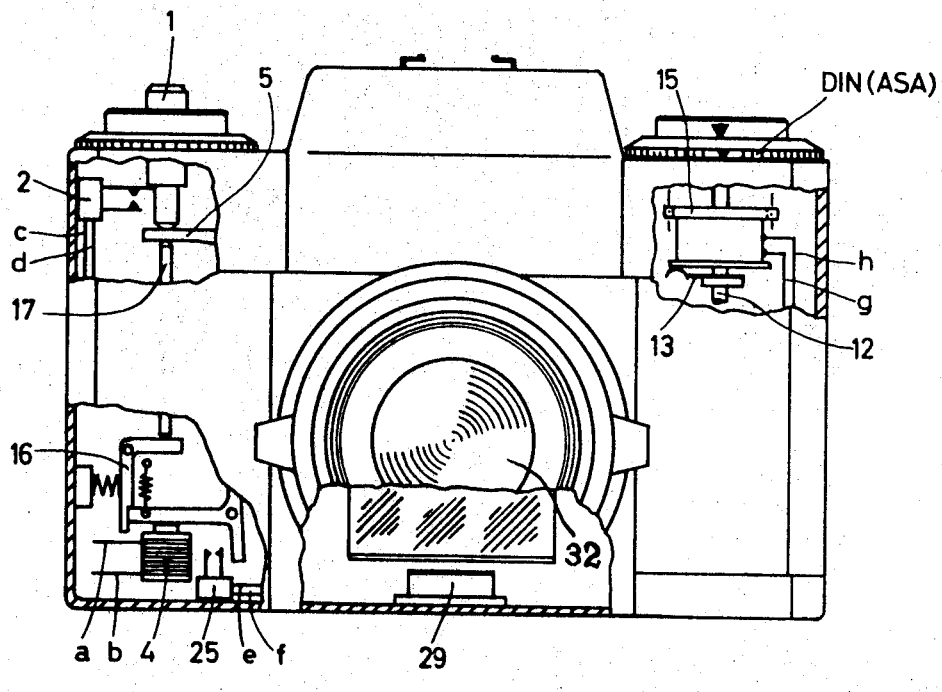
FIG. 5 illustrates a front elevation view, with certain parts broken away, of a single lens mirror reflex camera employing the exposure device of the invention.

When the diaphragm aperture has reached the desired value, the armature 18 of the magnet 4 is removed from the magnet after it was already previously released from its locked position by the pivoted lever 16 engaged by the vertical control rod 17 when the camera release button 1 was actuated. The armature 18 has the shape of a T-shaped lever pivoted at 18b and is subject to the action of a spring 19 attached to the end of the center leg of the lever 18. The nose 18a on the upwardly extending leg of the armature 18 is then caused to engage a toothed portion 9a of the rack bar 9 and locks it. Simultaneously locking lever 20 is pivoted counterclockwise by the action of a spring 21 and thereby releases a semi-circular control lever 22 which rotates about an axis 23 and extends concentrically around the optical axis of the camera objective 32 (FIG. 5). The pivotal movement of the lever 22 is limited by a stop pin 24 which engages the upper end face of the vertical rack bar 9, and with that, the camera diaphragm aperture is adjusted. The armature 18 during its clockwise movement closes a switch 25 of a conventional electronic shutter, not shown, by means of contacts e and f.

The invention may be employed with any type of conventional camera shutter. If for instance a purely mechanical shutter is used, the latter will be released directly by the control movement of the armature 18, and the switch 25 becomes superfluous.

The return movement of the rack bar 9 and the armature 18 into their starting position is effected by eccentric discs 26 and 27 which during the operation of the tensioning lever of the camera rotate once about their axes and thereby effect the return movement of the associated control elements.

FIG. 2 illustrates diagrammatically the circuit diagram of the invention. A battery 28 is connected by the switch 2 to the measuring circuit and the amplifier 3. Connected in series with each other in the input circuit of the amplifier 3 are the resistor group 14 and the photo-resistance cell 29. The partial voltage of the photo-resistance cell 29 is conducted to the amplifier 3 by the conductor 30.

The partial voltage of the photo-resistance cell 29 is first below that voltage which is critical for the deenergization of the magnet 4. If now the diaphragm as the last one of the exposure factors is so adjusted that the partial voltage on the photo-resistance cell reduces the resultant resistance of the resistor group 14, then at a predetermined setting of the diaphragm, a voltage value is reached at which the amplifier 3 effects the deenergization of the magnet 4.

If, as the last factor, the shutter speed adjusting member is adjusted, the resultant resistor valve of the resistor group 14 must be smaller prior to the desired balance than the resistance of the photo-resistance cell. In that case, the photo-resistance cell 29 and the resistor group 14 in FIG. 2 must be exchanged.

FIG. 4 illustrates diagrammatically a group of resistors with the adjustable exposure factors in which the diaphragm aperture is the last factor to be introduced. Between the two stationary guides A and B are arranged the independently adjustable slide members for the shutter speed, film speed and diaphragm aperture. The shutter speed slide member is locked with respect to the film speed slide member, and the film speed slide member is locked with respect to the diaphragm aperture slide member, so that when the shutter speed slide member is adjusted, the film speed slide member and the diaphragm aperture slide member are taken along. The adjustment of the film speed slide member effects the simultaneous adjustment of the diaphragm aperture slide member without, however, affecting the shutter speed slide member. The effect of the locking, then, goes only in one direction. The graduation of the input resistors is based on the ideal characteristic of a photo-resistance cell having a slope of 1. The individual resistors are connected with each other by contact bridges C, D, F and G arranged on the slides. The contact bridge G slides along the electrical branch conductor. In the window H are visible the pre-adjustable values. The arrow K indicates the diaphragm aperture associated with a predetermined illumination of the photo-resistance cell. The contact bridge G indicates the resultant resistance in KΩ of the resistor group, This balance resistance corresponds to an illumination of the photocell of 12,500 asb which corresponds to 64 lux on the photo-electric resistance.

In the embodiment of the invention illustrated in FIG. 5, the photo-resistance cell 29 is arranged inside the camera housing on the bottom wall thereof and is illuminated by light passing through the camera objective 32 in a manner similar to that disclosed in assignee's copending U.S. Pat. application Ser. No. 560,731 filed June 27, 1966, inventor Willi Günther, and allowed April 18, 1968.

We claim:

1. In a single-lens mirror reflex camera having a photo-resistance cell adapted to be illuminated by light passing through the camera objective, a shutter release, means for storing prior to the operation of said shutter release all of the exposure factors necessary for an exposure in accordance with the prevailing light conditions of the subject to be photographed, said means comprising a group of resistors wherein these factors with the exception of one, are introduced, said one factor being represented by one variable resistor which during its adjustment establishes a balance to produce a constant resistance ratio between said photo-resistance cell and said resistor group, means forming an electronic amplifier circuit into which the resulting partial potential is fed and serves to determine electromagnetically the balance value of said factor still to be adjusted.

2. A camera according to claim 1, in which said resistor group consists of a number of individual resistors which by the selection of said pre-adjustable exposure factors and the adjustable factor still to be determined, are combined with each other in such manner that with given adjustment paths of the pre-adjustable factors, the adjustment path required for a balance serves also for the adjustment of the last remaining exposure factor.

3. A camera according to claim 1, in which said resistor group comprises a function potentiometer having a housing and a slidable contact member, and means for adjusting said housing for introducing said pre-adjustable exposure factors, while said slidable contact member of said potentiometer serves for introducing the last remaining factor.

4. A camera according to claim 1, including an automatically adjustable diaphragm in said camera objective and a diaphragm aperture adjusting ring which is caused to be operated by the operation of said shutter release to engage an abutment the position of which is predetermined as to the diaphragm value required for the correct exposure.